United States Patent [19]

Sicotte

[11] Patent Number: 4,778,301

[45] Date of Patent: Oct. 18, 1988

[54] COMPACT MULTI-FUNCTION GLASS CLEANING DEVICE

[75] Inventor: Pierre Sicotte, Longueuil, Canada

[73] Assignee: Concept GSB Inc., Montreal, Canada

[21] Appl. No.: 60,235

[22] Filed: Jun. 10, 1987

[51] Int. Cl.⁴ .............................................. A47L 1/08
[52] U.S. Cl. .................................. 401/139; 401/27; 401/137
[58] Field of Search ............... 401/137, 139, 27, 37, 401/23

[56] References Cited

U.S. PATENT DOCUMENTS

| | | | |
|---|---|---|---|
| 732,205 | 6/1903 | Mable | 401/139 |
| 2,436,454 | 2/1948 | Sensenbach et al. | 401/139 |
| 2,702,915 | 3/1955 | Anderson | 401/139 X |
| 2,741,789 | 4/1956 | Ray | 401/139 |
| 2,770,826 | 11/1956 | Curfman | 401/139 |
| 3,118,166 | 1/1964 | Bell | 401/25 |
| 3,185,351 | 5/1965 | Klun | 401/139 X |
| 3,375,538 | 4/1968 | Mains | 401/139 X |
| 3,603,692 | 9/1971 | Ball et al. | 401/139 |
| 3,732,591 | 5/1973 | Gach | 401/139 X |
| 3,782,600 | 1/1974 | Columbus | 401/139 X |
| 4,652,163 | 3/1987 | Karliner et al. | 401/23 X |

FOREIGN PATENT DOCUMENTS

| | | | |
|---|---|---|---|
| 1281435 | 12/1962 | France | 401/37 |
| 240066 | 9/1925 | United Kingdom | 401/27 |
| 775900 | 5/1957 | United Kingdom | 401/25 |
| 1121062 | 7/1968 | United Kingdom | 401/139 |

Primary Examiner—Steven A. Bratlie

[57] ABSTRACT

A compact, multi-function glass cleaning device which comprises a housing having a hand grasping portion, a working end portion, and a spray end portion. A reservoir is provided in the housing with the spray end portion having a finger activated spray pump in communication with the reservoir. The working end has at least one glass surface cleaning element secured thereto. A detachable support is secured to the working end to conceal a glass surface cleaning element. The detachable support has detachable elements for easy removal and connection with the working end. The detachable support has at least another type of glass surface cleaning element.

12 Claims, 3 Drawing Sheets

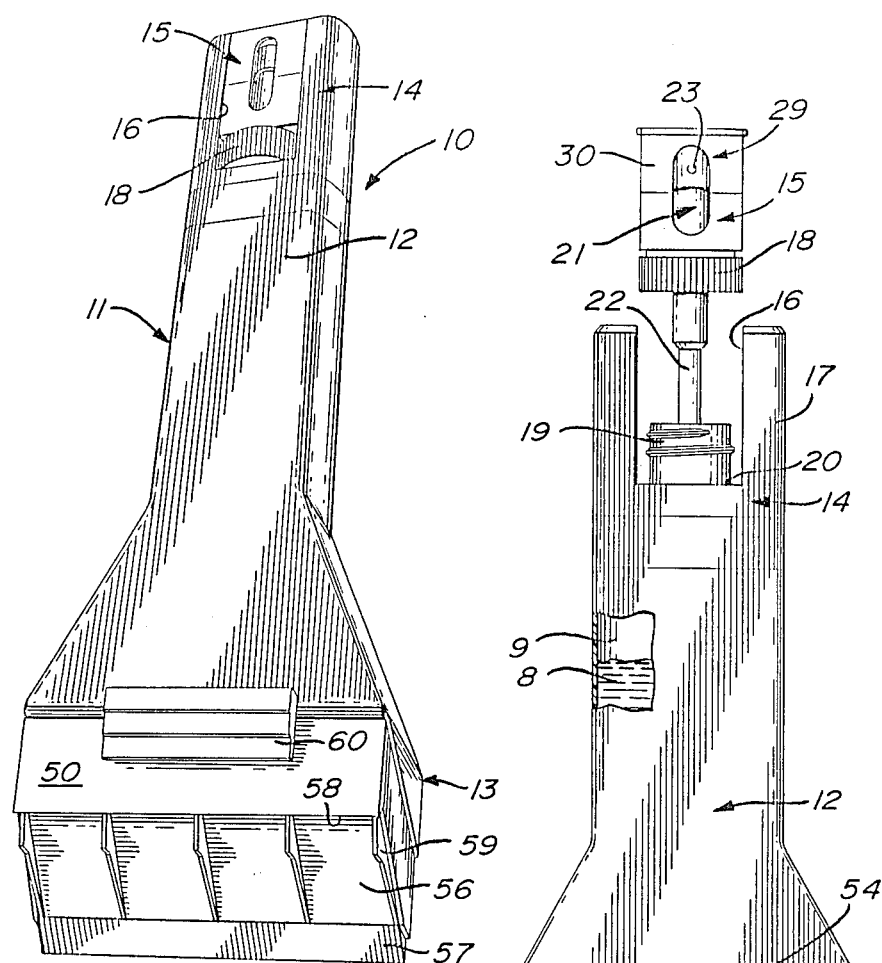
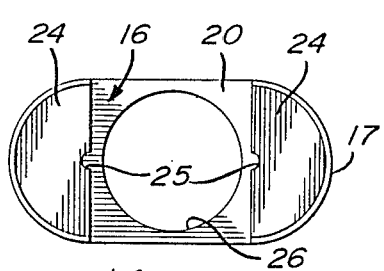
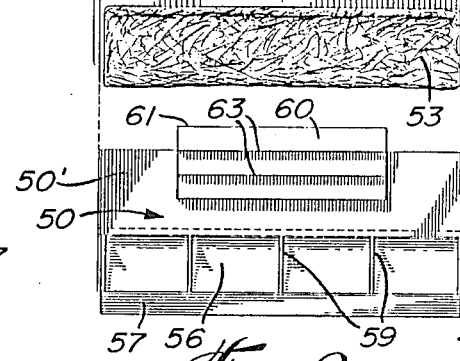

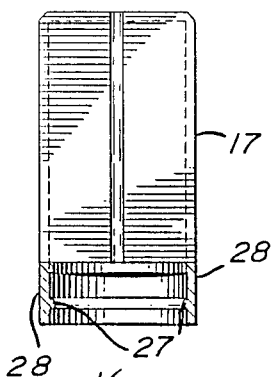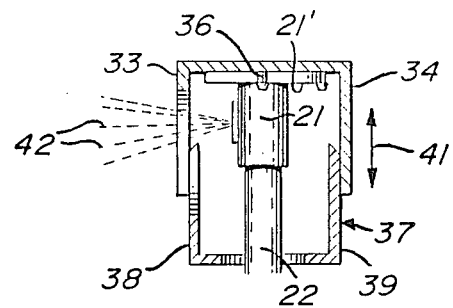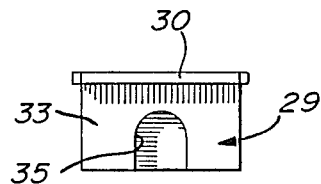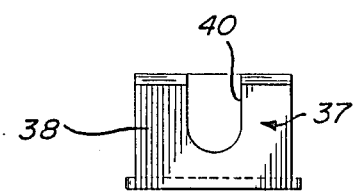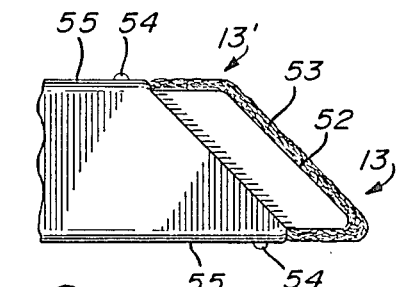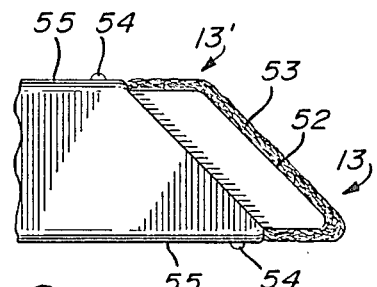

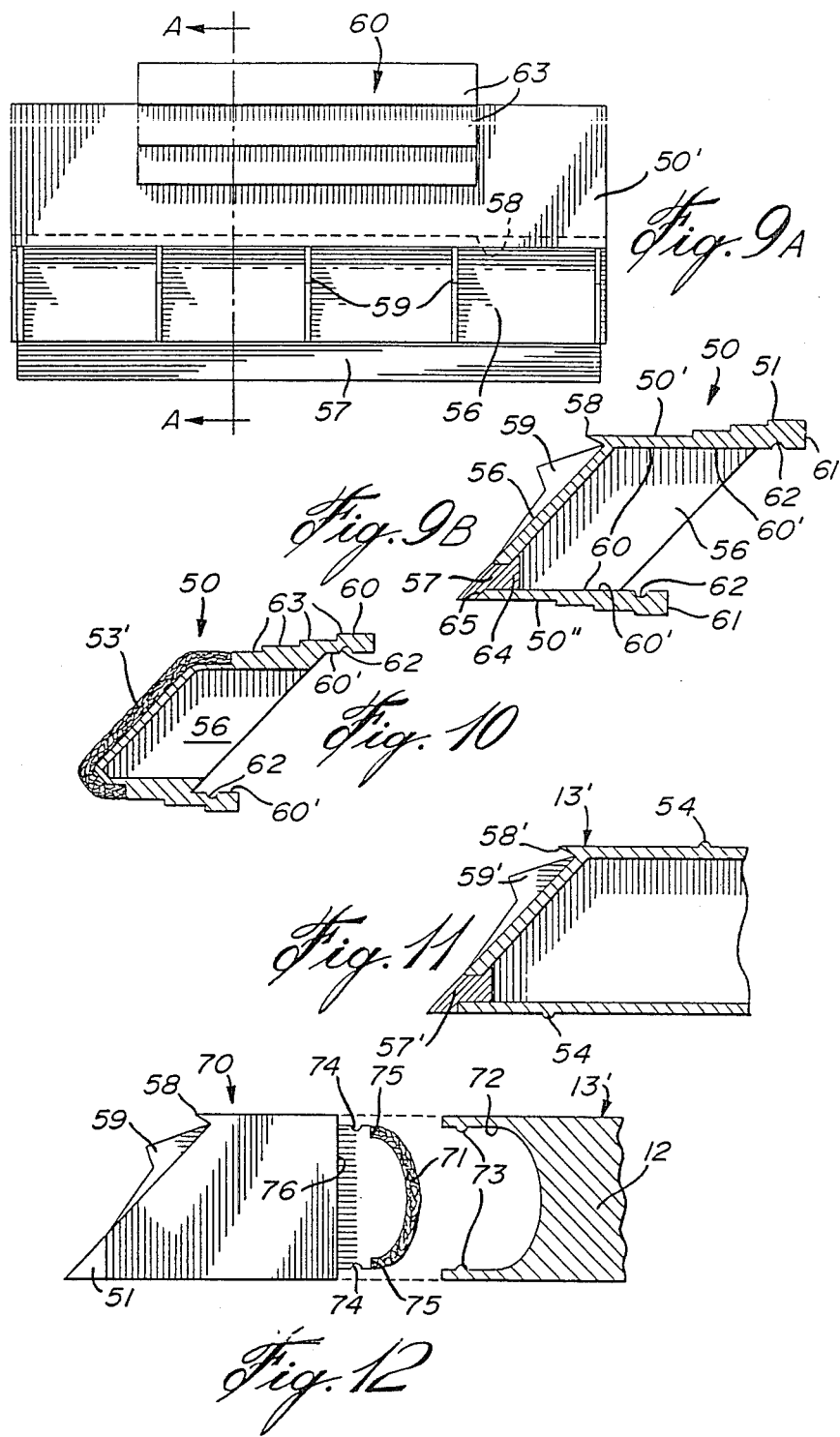

COMPACT MULTI-FUNCTION GLASS CLEANING DEVICE

BACKGROUND OF THE INVENTION

1. Field of the Invention

The present invention relates to an improved compact glass cleaning device, particularly for vehicle windows and having a plurality of cleaning elements incorporated therewith and suitable for multi-purpose use.

2. Description of Prior Art

Various composite glass cleaning devices are known comprising at least two surface cleaning elements and a reservoir containing a liquid therein with a finger activated spray pump permitting the ejection of the liquid in a spray. Such composite devices are, for example, shown in U.S. Pat. Nos. 732,205; 2,702,915; 2,741,789; and 3,118,166. In all of these structures, the devices are relatively bulky and not easily transportale in small storage areas, such as a glove compartment of an automobile. Also, many of these do not contain a scraping element capable of removing a layer of ice from a glass surface. Still further, the sponge element is not protected and consequently will unnecessarily accumulate dirt and dust. Still further, the working end of the device does not have a rigid construction and most easily fail, particularly of an ice scraper is adapted thereto. These structures are not compact, aesthetically pleasing, and easily storable in a small area.

SUMMARY OF INVENTION

It is a feature of the present invention to provide an improved multi-function glass cleaning device of the type above described, which is compact and which substantially overcomes the above-mentioned disadvantages of the prior art.

Another feature of the present invention is to provide a compact multi-function glass cleaning device having a detachable support at a working end thereof to protect a sponge or an abrasive pad located at the working end of the device, and wherein the device comprises a spray nozzle at one end of a handle portion. The detachable support has an ice breaker, a scraper, and wiper blade at the working end portion thereof, and wherein the detachable support is easily attached and detached from the working end portion.

According to the above features, from a broad aspect, the present invention provides a compact multi-function glass cleaning device which comprises a housing having a hand grasping portion, a working end portion, and a spray end portion. A reservoir is provided in the housing and the spray end portion having a finger activated spray pump in communication with the reservoir. The working end has a detachable support secured thereto. The detachable support has detachable securing means for easy removal and connection with the working end. The detachable support has at least two types of glass surface cleaning elements.

BRIEF DESCRIPTION OF DRAWINGS

A preferred embodiment of the present invention will now be described with reference to the accompanying drawings in which:

FIG. 1 is a perspective view of the compact multi-function glass cleaning device of the present invention;

FIG. 2 is an exploded side view of the glass cleaning device of the present invention;

FIG. 3 is a top view of the bridge member secured at the spray end portion of the device;

FIG. 4 is a side view of the bridge portion;

FIG. 5 is a sectional view showing the spray nozzle head assembly;

FIG. 6A is a front view of the pump head bridge member;

FIG. 6B is a bottom view of the pump head bridge member;

FIG. 7 is a front view of a lower cap portion;

FIG. 8 is a sectional end view of the working end portion of the housing;

FIG. 9A is a top view of the detachable support;

FIG. 9B is a section view along section lines A—A of FIG. 9A;

FIG. 10 is a section view of the detachable support showing a modification thereof;

FIG. 11 is a section view of the working end of the housing showing a further modification thereof; and FIG. 12 is an exploded view, partly in section and partly fragmented, showing a further modification of the working end of the housing and the detachable support.

DETAILED DESCRIPTION OF DRAWINGS

Referring now to the drawings, and more particularly to FIGS. 1 and 2, there is shown generally at 10 the compact multi-function glass cleaning device of the present invention and comprising a housing 11 having a hand grasping portion 12, a working end portion 13, and a spray end portion. The hand grasping portion 12 is an elongated shape of substantially rectangular cross-section and tapering outwardly towards the working end 13 to define a truncated portion. The interior of the hand grasping portion and the truncated portion constitute a reservoir 9 in which is contained a liquid 8, such as a cleaning liquid.

The spray end portion 14 has a spray nozzle head assembly 15 located within an open ended cavity 16 formed in the free end portion 17 of the hand grasping portion 12. The nozzle head assembly 15 is secured on top of a screw cap 18 which is threadably engageable about a threaded bottle neck 19 formed on the bottom wall 20, centrally of the cavity 16. A spray pump 21 is associated with the screw cap and has a conduit 22 leading within the reservoir 9 to pump the liquid out through the spray nozzle 23 of the pump 21.

Referring now additionally to FIGS. 3 to 7, there will be described the construction of the spray end portion 14. As shown in FIGS. 3 and 4, the free end portion 17 is a detachable portion and defines a pair of opposed guide arms 24 on opposed sides of the cavity 16. These guide arms 24 are each provided with an axial guide slot 25 centrally thereof to guide the nozzle head assembly 15 when pushed in a downward direction within the open ended cavity 16 to pump the liquid out through the spray nozzle 23. A cavity 26 is provided in the bottom wall of the free end portion 17 for securement under the screw cap 18 when threaded on the bottle neck 19. Also, the free end portion 17 may be provided with snap protrusions 27 in a depending flange wall portion 28 thereof for securement about the top end (not shown) of the hand grasping portion 12, but we ll known in the art. Of course, this free end portion 17 could also be glued or otherwise attached to the top portion of the hand grasping portion 12.

The spray nozzle head assembly 15 (see FIGS. 6A and 6B) comprises a pump head bridge member 29 defining a finger engaging top wall 30 having extension fingers 31 for engagement into the axial slots 25 of the free end portion 17 and extending outwardly from opposed parallel edges 32 thereof. The bridge member 29 also has a front and rear depending wall 33 and 34 with the front wall having a spray nozzle opening 35 therein. Securement tabs 36 are provided on the bottom surface 30' of the top wall 30 for engagement with the top wall 21' of the pump 21, as shown in FIG. 5.

The nozzle head assembly 15 further comprises a lower inverted U-shaped cap portion 37, as shown in FIGS. 5 and 7, which is attached by suitable means, not shown, over the top wall of the screw cap 18. This U-shaped cap portion 37 also has a front and rear wall 38 and 39 respectively, with the front wall having a spray nozzle opening 40 configured for alignment with the opening 35 in the bridge member 29. The lower inverted U-shaped cap portion 37 is also received within the front and rear wall 33 and 34 of the bridge member 29, so that the bridge member may be displaced downwardly and upwardly over the lower cap portion 37 in the direction of arrow 41, as indicated in FIG. 5. When the pump is activated in this fashion a spray 42 will be ejected through the opening formed by the aligned openings 35 and 40 of the members 29 and 37. The manner of operation of the pump is well known to a person skilled in the art and need not be described in detail.

Referring now more specifically to FIGS. 1, 2, and 9A to 11, there will be described the construction of the working end portion 13 of the housing 11. As herein shown, the working portion 13 is provided with a detachable support 50 having detachable securement means 51 whereby to detachably secure same on the working end 13.

As shown in FIGS. 1 and 8, when the detachable support 50 is removed from the housing, the free end 13' at the working end 13 of the handle portion 12 defines a slanted wall 52 on which is secured by suitable fastening means, such as glue, a sponge or an abrasive pad element 53 having a fibrous cleaning surface whereby to scrub a glass surface to remove soil adhered thereto. An elongated rib 54 is provided in the top and bottom surfaces 55 and 56 of the working end portion 13 for receiving in snap fit thereover the detachable support 50 which is illustrated in FIG. 9B.

The detachable support 50 defines a sponge receiving chamber 56 for receiving the free end portion 13' of the working end portion 13. The detachable support has a sloped outer wall 56 defining a flat angulated face and opposed, parallel, elongated edges having a rubber blade 57 in one edge and a rigid scraper blade 58 in the opposed edge. A plurality of transverse pointed teeth elements 59 are disposed in a spaced apart manner over the sloped outer wall 56 whereby to break up ice layers that may form on a glass surface, such as a windshield of an automobile. These teeth would slit the ice surface while the scraper 58 trailing the teeth would scrape off loosened ice layers.

The detachable securing means 51 are comprised by a securing flange 60 extending rearwardly and beyond a rear edge 61 of the support 50 over the top and bottom walls 50' and 50". These flanges define a finger engaging rear edge 61 for finger gripping engagement for the removal of the detachable support 50 from the working end 13 of the housing. An elongated groove 62 is provided in the bottom wall 60' of each flange 60 for snap fit with associated ones of the elongated ribs 54 on the working end of the housing. Each of the securing flanges is provided with two or more elevated ridges 63 on an outside face thereof for ease of finger engagement for positioning the detachable support 50 over the working end 13' and the sponge element secured thereto.

As better illustrated in FIG. 9B the forwardmost one of the elongated edges containing the rubber blade is formed with a slot 64 for securing the rubber blade 57 therein. The rubber blade 57 is inserted by the interior of the chamber 56 of the detachable support and held captive within the slot 64 by a snap ridge 65 formed within the rubber blade.

FIGS. 10 and 11 illustate a variation of the construction of the working end portion of the device and wherein the various glass surface cleaning elements have been inverted, that is to say, the detachable support 50 as herein shown is provided with a sponge 53' whereas the working end 13' of the housing is provided with the scraper blade 58', the pointed teeth 59' and the rubber blade 57'. However, the construction of the detachable support 50 and working end 13', as shown in FIGS. 8 and 9B, is the preferred one.

Referring now to FIG. 12, there is shown a still further example of the construction of the detachable support 70. As herein shown, the support is provided with the scraper elements 58, 59 and 51, as shown in FIG. 9B, but in the opposed rear wall 76 is provided with a sponge or abrasive material 71 for scrubbing glass to remove deposits thereon such as insects, grease, etc. This sponge section 71 is received within a cavity 72 provided in the working end portion 13' of the housing 12, and retained therein by snap ribs 73 which are engaged in the complementary snap cavity 74 provided on the opposed connecting wall 75 of the rear wall 76 of the detachable support 70. Also, the attachment fasteners of FIGS. 8 and 9B could also be adapted to this modification.

It is within the ambit of the present invention to cover any obvious modifications of the preferred embodiment described herein, provided each modifications fall within the scope of the appended claims.

I claim:

1. A compact multi-function glass cleaning device capable of being stored in the glove compartment of a vehicle and comprising a housing having a hand grasping portion, an enlarged integrally formed working end portion and a spray end portion located at a free end of said hand grasping portion; a reservoir in said housing and extending into both said hand grasping and working end portions, said spray end portion having a finger activated spray pump in communication with said reservoir, said working end portion having a detachable support secured thereto, said detachable support having detachable securing means for easy removal and connection with said working end portion, said detachable support having at least one glass surface cleaning elements incorporated therewith, said enlarged working end portion having a glass cleaning element secured to an inner working end, said detachable support having different types of glass surface cleaning elements than said inner working end and attachable over said inner working end to protect same.

2. A glass cleaning device as claimed in claim 1 wherein said spray end portion comprises an open ended cavity formed in said free end of said hand grasping portion, a pair of opposed guide arms to each side of said cavity, axial guide means in each said guide arms, a spray nozzle head assembly being disposed within said cavity.

3. A glass cleaning device as claimed in claim 2 wherein said spray nozzle head assembly comprises a pump head bridge member secured to a head of said pump and having guide engagement means for sliding engagement with said axial guide means.

4. A glass cleaning device as claimed in claim 3 wherein said axial guide means is a longitudinal slot disposed centrally in opposed flat side walls of said cavity, said pump head bridge member having a top wall with extension fingers disposed centrally and extending outwardly from opposed parallel edges thereof, said fingers constituting said guide engagement means.

5. A glass cleaning device as claimed in claim 3 wherein said spray nozzle head assembly further comprises a threaded bottle neck disposed centrally above a bottom wall of said cavity, a screw cap threadably engageable with said bottle neck, said bridge member having a front and rear depending wall extending across said cavity, a lower inverted U-shaped cap portion disposed under said screw cap and also having a front and rear wall which are received behind said front and rear depending walls of said bridge member, a spray nozzle opening in each said front and rear wall, said inverted U-shaped cap portion front and rear walls also extending across said cavity.

6. A glass cleaning device as claimed in claim 1, said enlarged free end being a truncated end diverging outwardly from said hand grasping portion, there being two of said glass surface cleaning elements at said working end, one being a rigid ice scraper and the other being a rubber blade scraper, said detachable support having a sponge element with a fibrous cleaning surface secured thereto.

7. A glass cleaning device as claimed in claim 1 wherein said glass surface cleaning element secured to said inner working end is a sponge element having a fibrous cleaning surface.

8. A glass cleaning device as claimed in claim 7 wherein said detachable support has a sponge receiving chamber for receiving said sponge element therein when connected to said working end, said support having a sloped outer wall defining a flat angulated face and opposed elongated parallel edges, a rubber blade in a forwardmost one of said elongated edges, said sloped outer wall having a plurality of transversely extending pointed teeth spaced apart thereon, and a rigid spacer blade extending along a rearmost one of said elongated edges.

9. A glass cleaning device as claimed in claim 8 wherein said detachable securing means comprises a securing flange extending rearwardly in a respective one of opposed top and bottom walls, said flanges defining finger engaging edges for removing said detachable support from said working end, and an elongated groove in each said flange for snap engagement with a locking rib disposed on opposed walls of said working end rearwardly of said sponge element.

10. A glass cleaning device as claimed in claim 9 wherein said securing flanges are each provided with elevated ridges on an outside face thereof for friction finger engagement for positioning said detachable support over said sponge element and engagement of said grooves with said locking ribs.

11. A glass cleaning device as claimed in claim 8 wherein said forwardmost one of said elongated edges has a blade receiving slot, said rubber blade being disposed in said slot through said sponge receiving chamber and held captive in said slot by a ridge portion formed integral with said rubber blade.

12. A glass cleaning device as claimed in claim 1 wherein said enlarged free end is a truncated end diverging outwardly from said hand grasping portion, a cavity within a free end of said truncated end, said detachable support having a sloped outer wall defining a flat angulated face and opposed elongated parallel edges, a rubber blade in a forwardmost one of said elongated edges, said sloped outer wall having a plurality of transversely extending pointed teeth spaced apart thereon, and a rigid scraper blade extending along a rearmost one of said elongated edges, said detachable support having a rear wall with a sponge element secured thereto, said sponge element being retained in said cavity of said enlarged free end when said detachable support is connected thereto.

* * * * *